M. J. MOLITOR & M. BRITZ.
BOW REST FOR AUTOMOBILES.
APPLICATION FILED APR. 4, 1913.

1,090,329.

Patented Mar. 17, 1914.

Witnesses
Chas. E. Kamper,
Frank S. Ratcliffe.

Inventor
M. J. Molitor,
M. Britz.
By Chandler & Chandler
Attorneys

COLUMBIA PLANOGRAPH CO., WASHINGTON, D. C.

UNITED STATES PATENT OFFICE.

MARTIN J. MOLITOR AND MATHIAS BRITZ, OF ZIONS, MINNESOTA; SAID MOLITOR ASSIGNOR TO PETER M. BRITZ AND JAMES S. BRITZ, BOTH OF ROSCOE, MINNESOTA.

BOW-REST FOR AUTOMOBILES.

1,090,329.     Specification of Letters Patent.     Patented Mar. 17, 1914.

Application filed April 4, 1913. Serial No. 758,861.

*To all whom it may concern:*

Be it known that we, MARTIN J. MOLITOR and MATHIAS BRITZ, citizens of the United States, residing at Zions, in the county of Stearns, State of Minnesota, have invented certain new and useful Improvements in Bow-Rests for Automobiles; and we do hereby declare the following to be a full, clear, and exact description of the invention, such as will enable others skilled in the art to which it appertains to make and use the same.

This invention relates to new and useful improvements in bow rests for automobiles and has particular reference to that class of bow rests which are adapted to receive the bows of an automobile top and prevent them from undesired disengagement caused by jarring of the machine.

The object of this invention resides in the provision of a bow rest for automobiles provided with means for maintaining the bows therein against undesired displacement.

The invention also contemplates the provision of simple and efficient means for holding the bow rest in open position to allow the bows to be withdrawn.

A further object of the invention is to improve the efficiency and simplify the structure of a device of this character.

With these and other objects in view, the invention resides in the novel combination, formation and arrangement of parts to be more fully hereinafter described and particularly pointed out in the claim hereto appended.

Figure 1:
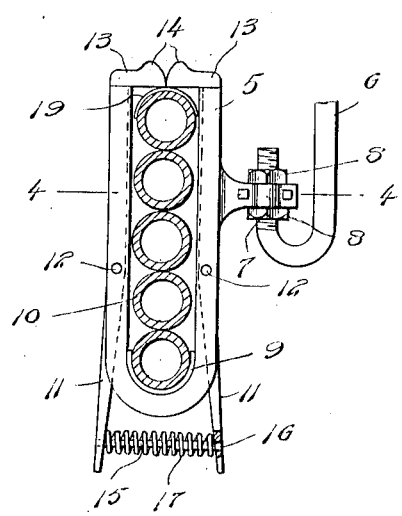
Figure 2:
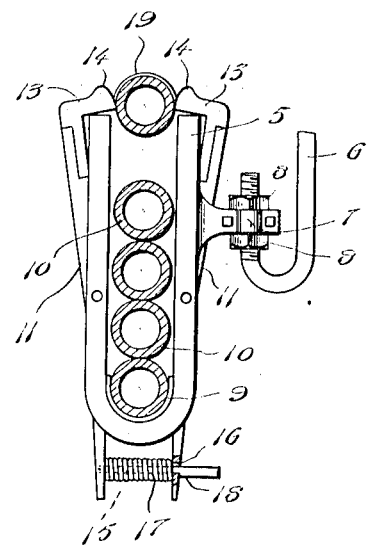
Figure 3:
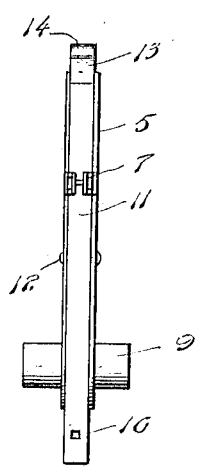
Figure 4:
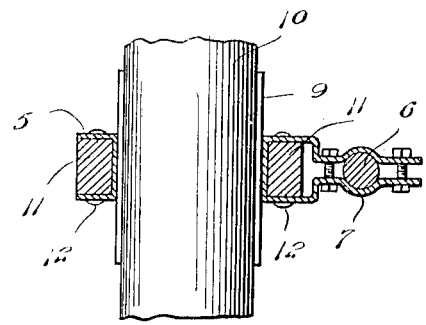

Reference is had to the accompanying drawings wherein similar characters of reference designate corresponding parts throughout the several views, and in which:

Figure 1 is a side elevational view of the device with a plurality of bows positioned therein, Fig. 2 is a similar view showing the holding members of the rest held with their upper ends in spaced relation to permit disengagement of the bows therefrom, Fig. 3 is an end elevation of the device, and Fig. 4 is a transverse sectional view on the line 4—4 of Fig. 1.

Referring more particularly to the drawings, 5 designates the main U-shaped frame which is secured on a suitable support 6 carried by an automobile by means of a clamp 7 extending from one arm of the frame. This support 6 is provided with lock nuts 8 for holding the clamp in position. The frame 5 is formed of channel iron with the free sides of the walls thereof being directed outwardly. The bight of the frame has fastened thereon a curved plate 9 which is adapted to receive the lowermost of the bows 10 which are adapted to be seated in the frame.

The means for holding the bows within the frame comprises a pair of arms 11 which are pivoted as at 12 to the frame and which are seated in the channel thereof. The upper ends of these arms terminate in laterally directed extensions 13 which close the free end of the frame 5 to prevent the bows from being jarred out of the frame. These extensions 13 are provided at their free ends with enlarged heads 14 which are oppositely beveled on adjacent faces to permit the bows forcing the arms apart when the bows are inserted in the frame. Each of these arms 11 is tapered away from the inner wall of the arms of the frame below the pivotal connection 12 so that the arm 11 will be permitted to rock on the pivot. To provide means for holding the extension 13 normally in contacting relation a pin 15 is pivoted to one of the holding members and is passed through the slot 16 formed in the other member. An expansile spring 17 surrounds this pin 15 and bears against the inner faces of the arms 11 to normally force them apart.

Means for locking the arms 11 in open relation are provided by forming the pin 15 with a shoulder 18 adjacent its free end. When the lower ends of the arms 11 are moved inwardly against the pressure of the spring 17 the pin 15 can be swung downwardly allowing the shoulder 18 to engage against the outer edge of the slot 16 to thus form a locking means for holding the arms 11 open. The uppermost of the bows 10 is preferably provided with a suitable shield member 19 to prevent damage caused by the said bow member against the lower face of the extension 13.

What is claimed is:

A bow rest comprising a U-shaped channel frame, holding members pivoted in the channels of the arms of the frame, inwardly directed lateral extensions at the upper extremities of the holding members, the lower ends of the holding members being extended past the frame and a pin pivoted to one of the holding members and passed through the other member, an expansile spring surrounding the pin and engaging the ends of the members for resiliently forcing said ends apart and a shoulder formed on the pin for engagement with an adjacent holding member to hold the members in closed relation.

In testimony whereof, we affix our signatures, in the presence of two witnesses.

MARTIN J. MOLITOR.
MATHIAS BRITZ.

Witnesses:
LOUISE MUGGLI,
PETER RAEDER.

Copies of this patent may be obtained for five cents each, by addressing the "Commissioner of Patents, Washington, D. C."